(12) United States Patent
Compton et al.

(10) Patent No.: US 7,686,464 B2
(45) Date of Patent: Mar. 30, 2010

(54) MULTI-FACED CONVERSATION MIRROR

(75) Inventors: Grant A. Compton, Livonia, MI (US); Jay R. Degenkolb, Rockwood, MI (US); Doug Vandervoort, Novi, MI (US); George Walowich, Farmington Hills, MI (US); Lynda Kristen Fulgenzi, Northville, MI (US); Lisa Burns, Northville, MI (US); Gerald L. Elrite, New Hudson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 118 days.

(21) Appl. No.: 11/758,185

(22) Filed: Jun. 5, 2007

(65) Prior Publication Data

US 2008/0304171 A1      Dec. 11, 2008

(51) Int. Cl.
G02B 5/08 (2006.01)
(52) U.S. Cl. ...................................... 359/866
(58) Field of Classification Search ................ 359/866, 359/872
See application file for complete search history.

(56) References Cited

U.S. PATENT DOCUMENTS

| | | | |
|---|---|---|---|
| 4,264,144 A | 4/1981 | McCord | |
| 4,486,075 A * | 12/1984 | Cohen | 359/865 |
| 4,852,986 A | 8/1989 | Yu | |
| 4,934,802 A | 6/1990 | Fluharty et al. | |
| 5,165,081 A | 11/1992 | Drumheller | |
| 5,621,569 A | 4/1997 | Schlenke | |
| 6,589,911 B2 | 7/2003 | Matsugu et al. | |
| 6,690,803 B2 * | 2/2004 | Dykstra | 381/86 |
| 7,001,032 B2 | 2/2006 | Lo | |
| 7,055,883 B2 * | 6/2006 | Tokutomi et al. | 296/37.8 |
| 2002/0159168 A1 | 10/2002 | Epps et al. | |
| 2003/0091201 A1 | 5/2003 | Dykstra | |
| 2006/0023323 A1 | 2/2006 | Meng | |

* cited by examiner

Primary Examiner—Euncha P Cherry
(74) Attorney, Agent, or Firm—Shook, Hardy & Bacon L.L.P.

(57) ABSTRACT

A conversation mirror assembly is provided for use in passenger compartments of motor vehicles. The conversation mirror assembly includes a mirror housing having a mirror support surface. A first conversation mirror face biased toward the driver is fitted to the mirror support surface. A second conversation mirror face biased toward the front seat passenger is fitted to the mirror support surface adjacent the first conversation mirror. The first conversation mirror face and the second conversation mirror face may be either spherical or aspherical. The first conversation mirror face may be separate from the second conversation mirror face. Alternatively, the first conversation mirror face and the second conversation mirror face define two facets of a single mirror.

20 Claims, 10 Drawing Sheets

MULTI-FACED CONVERSATION MIRROR

TECHNICAL FIELD

The disclosed invention relates generally to conversation mirrors for vehicles. More particularly, the disclosed invention relates to a conversation mirror having two convex elements that are oriented in such a way as to provide front row occupants optimal view of occupants in subsequent rows behind them. The two convex elements may be spherical or aspherical.

BACKGROUND OF THE INVENTION

In the modern family vehicle there is at least one rear seat and in most mini-vans and sport utility vehicles there is typically more than one rear seat. This additional room is frequently occupied by children. Drivers and the front seat passenger have found it difficult to monitor the activities of children in the rear seats. The added passenger room also makes it difficult for a driver or a front seat passenger to carry on a conversation with a rear seat passenger while trying to maintain some degree of eye contact.

Recognizing that the conventional rear view mirror does not provide a good solution to this problem, auto manufacturers began offering "conversation mirrors" which are separate from the conventional rear view mirror. The conversation mirror is usually mounted in the ceiling of the vehicle, either as a fixed component or as a component capable of folding into a ceiling-mounted console. While the conversation mirror does generally aid in maintaining eye contact between the driver or front seat passenger and the rear seat passenger, findings suggest that the most valuable feature of the conversation mirror is that the activities of rear-seat children can be monitored by parents seated in the front seats of the vehicle.

The known conversation mirror comes in two varieties. The first is the single adjustable conversation mirror that is generally small and is made with a relatively large radius of curvature, typically ~150 mm. This type of mirror is adjusted for and used by only one front seat occupant at a time.

The second variety of known conversation mirrors uses a single, fixed spherical mirror of relatively small radius. While this design permits simultaneous usage by both front row occupants, the image produced has objectionable and pronounced foreshortening effects due to the variation in distance from the viewer to the different second row passengers.

The utility of both varieties is further compromised by their excessively wide field of view (FOV). This wide field of view produces overly-inclusive and thus unnecessary views as well as small images. Accordingly, as in so many areas of motor vehicle technology, there is room in the art of interior mirrors for advancement.

SUMMARY OF THE INVENTION

The conversation mirror assembly as provided herein overcomes the limitations and compromises of known technology by using an appropriately-shaped mirror surface. The mirror assembly includes a mirror which has either a spherical surface or an aspherical surface. The phrase "aspherical surface" refers to any surface that deviates from a spherical shape. Optical systems have historically incorporated aspherical surfaces to fulfill optical requirements that would otherwise be difficult and cumbersome to satisfy. Aspheric mirrors have been used in vehicle applications as outside mirrors. Such mirrors are generally convex, but they commonly vary in radius of curvature across the horizontal dimension. In outside vehicle mirrors the surface defines a longer radius of curvature on the inboard side than on the outboard side, thus providing a gentle curve on the inboard side and a stronger curve on the outboard side. This relatively complex shape overcomes problems of image magnification and the resultant distance distortion associated with conventional spherical mirrors by producing a larger field of view with reduced distance distortion.

The conversation mirror assembly as provided herein in its various embodiments is directed to use in passenger compartments of motor vehicles, air craft and boats. More particularly, the conversation mirror assembly as provided herein includes a mirror housing having a mirror support surface. A first aspheric conversation mirror biased toward the driver is fitted to the mirror support surface of the mirror housing. A second aspheric conversation mirror biased toward the front seat passenger is fitted to the mirror support surface of the mirror housing adjacent the first conversation mirror. Both the first conversation mirror and the second conversation mirror have the same aspheric shape. Where the aspheric mirror surface is used the multiple radii defined by the surface optimizes the image by reducing the effect of distance foreshortening.

In the first embodiment of the invention the first conversation mirror is separate from the second conversation mirror. In an alternate embodiment of the invention, the first conversation mirror and the second conversation mirror define two faces or surfaces of a single mirror with each face or surface defining an aspheric surface.

Other advantages and features of the embodiments of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
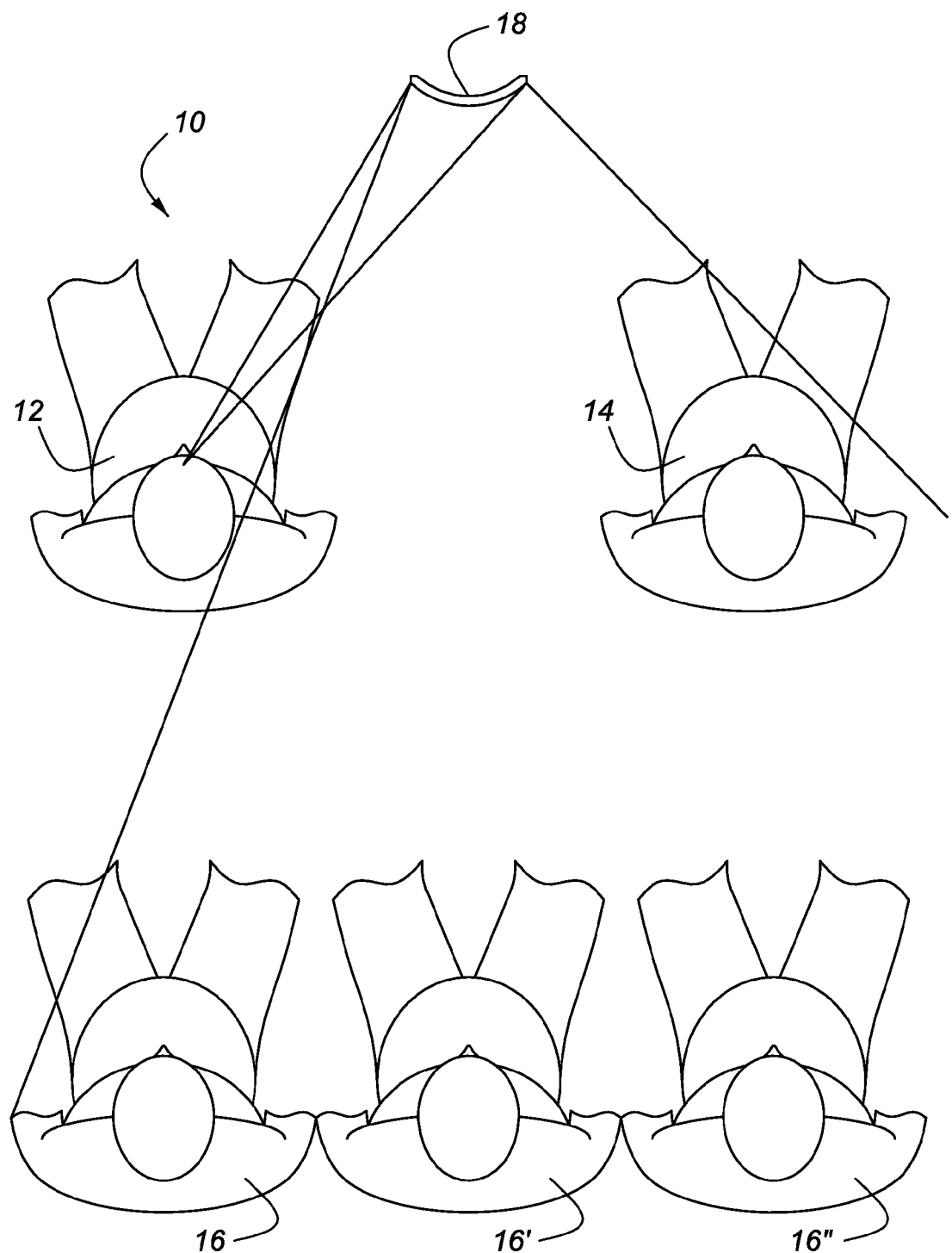
FIG. 1 illustrates a stylized plan view of an interior of a vehicle and the view perceived by the driver using a conventional conversation mirror.

In the following figures, the same reference numerals will be used to refer to the same components. In the following description, various operating parameters and components are described for one constructed embodiment. These specific parameters and components are included as examples and are not meant to be limiting.

With reference to FIG. 1, a stylized plan view of a vehicle interior, generally illustrated as 10, is shown. The illustrated vehicle interior 10 includes a driver 12, a front seat passenger 14, and rear-seat passengers 16, 16', 16".

A conversation mirror 18 according to the prior art is illustrated vehicle forward of the driver 12 and the front seat passenger 14. As is known in the art, the prior art conversation mirror 18 is a single spherical mirror surface. With this configuration, the view in the conversation mirror 18 visible to the driver 12 is overly wide and includes objects outside of the vehicle. This is illustrated by the field of view shown in FIG. 1. In addition, the different distances between the driver 12 and the rear-seat passengers 16, 16', 16" produces a foreshortened view that is objectionable to the driver.

The present invention provides either a spherical or aspherical mirror surface which overcome the foreshortening and overly-broad field of view of the prior art by providing an optimized and normalized rear view. The aspherical version of the present invention adjusts for foreshortening by introducing a mild distortion and keeps images as large as practicable.

Figure 2:
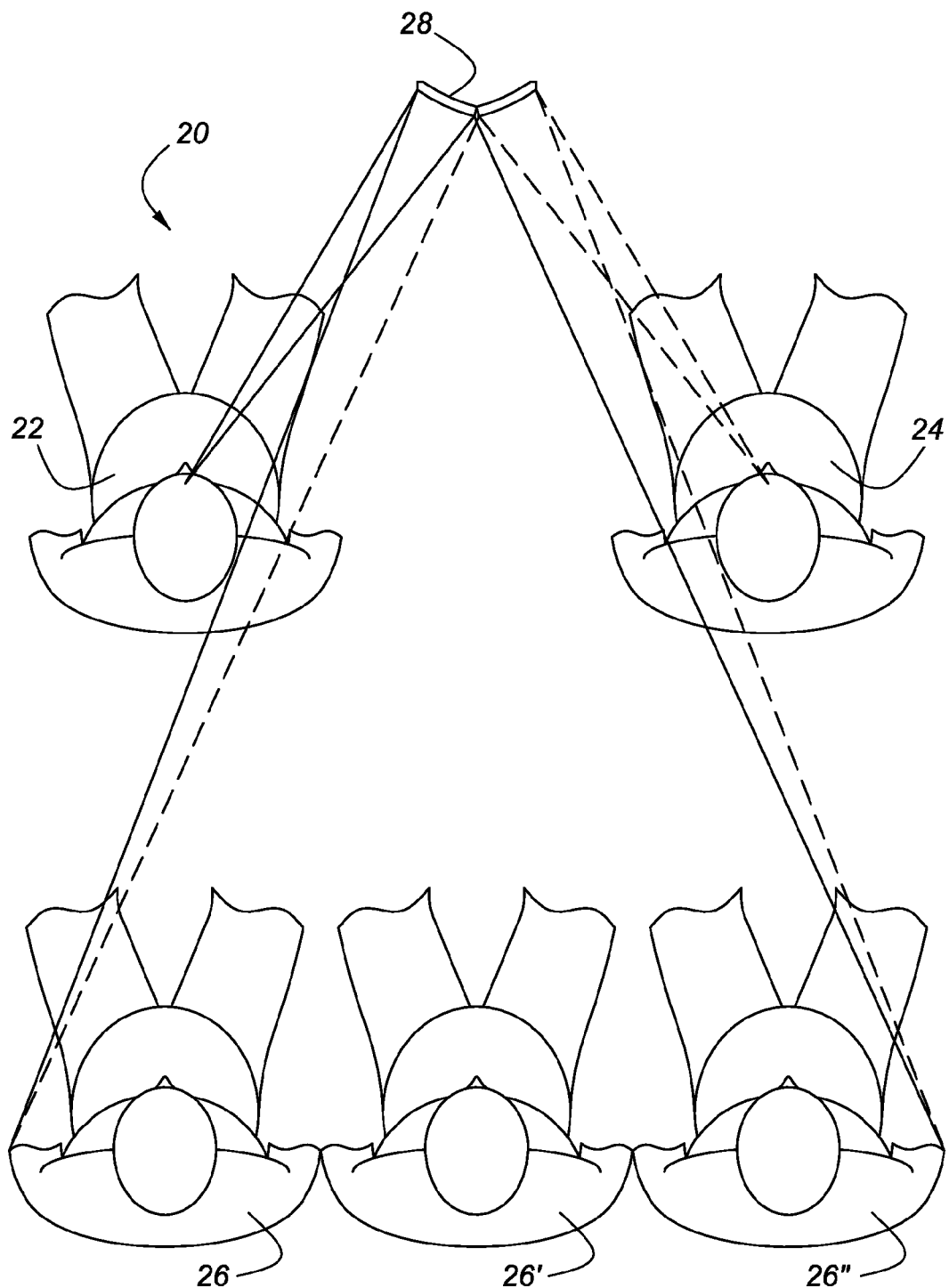
FIG. 2 illustrates a stylized plan view of an interior of a vehicle and the views perceived by both the driver and the front seat passenger using a conversation mirror of the present invention.

The arrangement of the conversation mirror of the present invention is shown in FIG. 2 in which a stylized plan of a vehicle interior, generally illustrated as 20, is shown. The vehicle interior 20 would typically be that of a motor vehicle but may illustrate a marine vehicle or an airplane as well. The illustrated vehicle interior includes a driver 22, a front seat passenger 24, and rear-seat passengers 16, 16', 16". It should be noted that while seating for five individuals is illustrated the number and arrangements of seats may be varied.

A conversation mirror 28 according to the present invention is illustrated vehicle forward of the driver 22 and the front seat passenger 24. The conversation mirror 28 may include a spherical mirror surface, an aspherical mirror surface, or a combination of these two surfaces. Regardless of the type of surface, the conversation mirror 28 provides dual mirror faces and any of the conversation mirrors shown in the figures and discussed herein may be of either type of mirror surface. Using the dual mirror face arrangement of the present invention in its various configurations in which each mirror radius is biased toward the front row viewer, the front row occupants have an optimized and normalized view in which foreshortening due to the differences in distance from the viewer to the second row occupants is either reduced or is eliminated. The illustrated fields of view highlight the advantages of the present invention over the single radius design of the prior art. Specifically, the field of view of the driver 22, illustrated by solid lines, focuses on the passengers 26, 26', 26" and does not substantially exceed this range. Similarly the field of view of the passenger 24, illustrated by broken lines, also focuses on the passengers 26, 26', 26".

Figure 3:
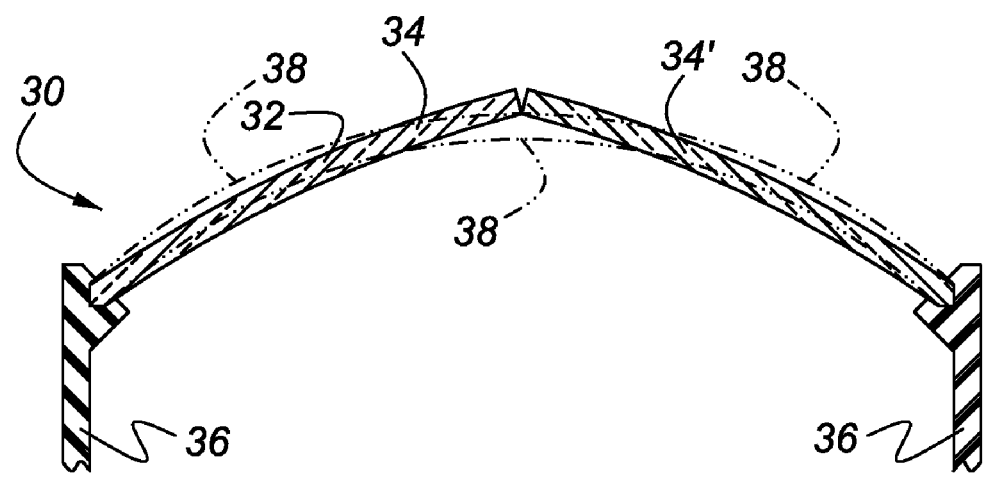
FIG. 3 illustrates a sectional view of a first preferred embodiment of a conversation mirror according to the disclosed invention with adjacent spherical mirror surfaces and having an outline of the conventional conversation mirror shown in broken lines.

One of the first embodiments of the conversation mirror according to the present invention is illustrated in FIG. 3 in which a conversation mirror assembly, generally illustrated as 30, is shown in sectional view. The conversation mirror assembly 30 includes a dual mirror face arrangement 32 of a one-piece design which is defined by two mirror faces or surfaces 34, 34' which are integrated to form the one-piece dual mirror face arrangement 32. A housing 36 is provided in which a portion of each of the two mirror faces 34, 34' is fitted. By contrast to the illustrated dual mirror face arrangement 32, a conventional single radius design mirror surface, illustrated in broken lines as conventional mirror surface 38, is shown.

Figure 4:
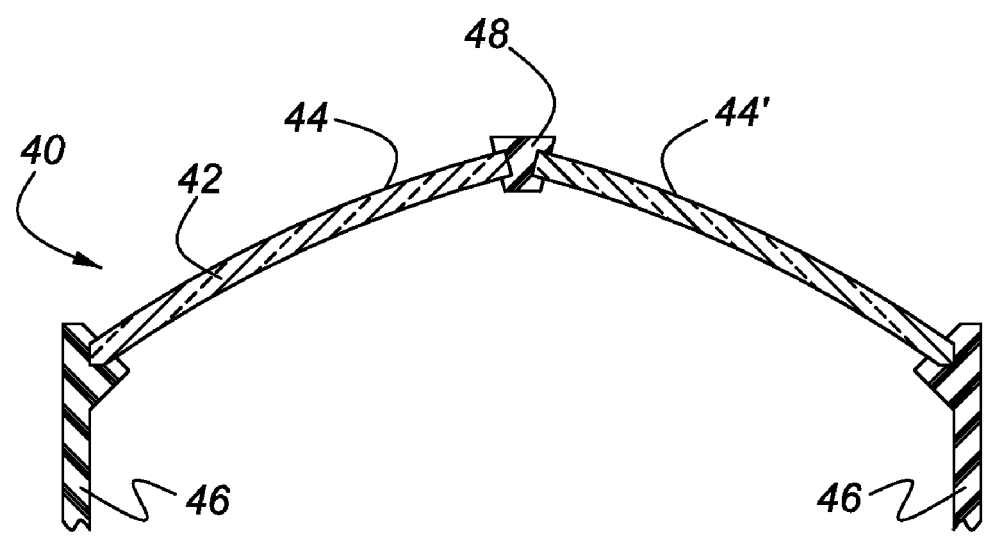
FIG. 4 illustrates a sectional view of a second preferred embodiment of a conversation mirror according to the disclosed invention with adjacent spherical mirror surfaces.

A second embodiment of the conversation mirror of the present invention is illustrated in FIG. 4 in which a conversation mirror assembly, generally illustrated as 40, is shown in sectional view. The conversation mirror assembly 40 includes a dual mirror face arrangement 42 of a two-piece design which is defined by two mirror faces or surfaces 44, 44'. A housing 46 is provided in which a portion of each of the two mirror faces 44, 44' is fitted. In addition, a bridge 48 is provided to serve as the central attachment area for the two mirror faces 44, 44'.

Figure 5:
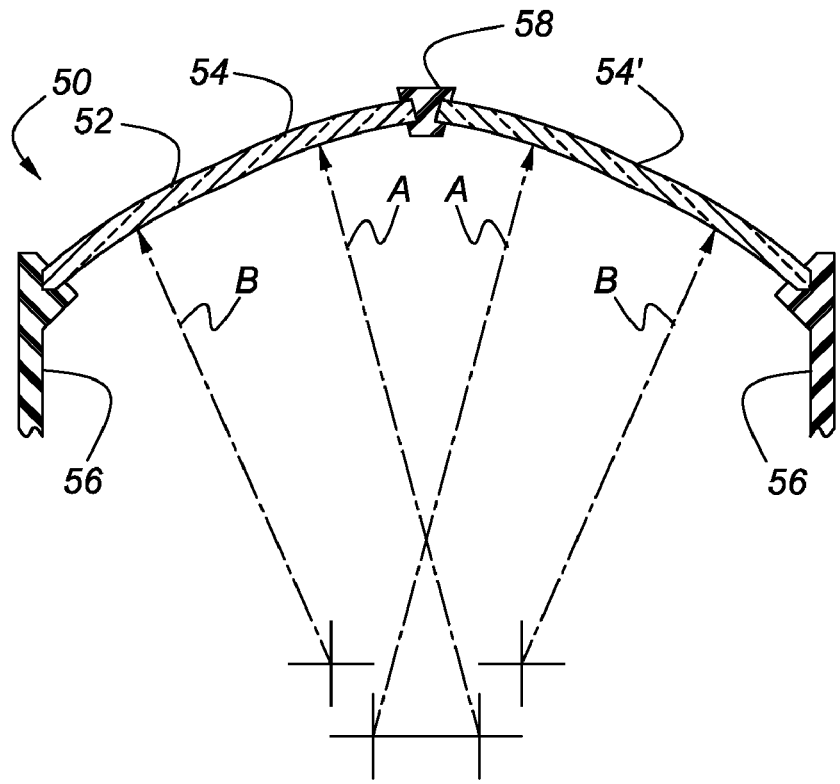
FIG. 5 illustrates a sectional view of a third preferred embodiment of a conversation mirror according to the disclosed invention with adjacent aspherical mirror surfaces.

As a further variation to the conversation mirror of the present invention an aspheric two-piece mirror configuration is shown in FIG. 5. With reference thereto, a conversation mirror assembly, generally illustrated as 50, is shown in sectional view. The conversation mirror assembly 50 includes a dual mirror face arrangement 52 which is defined by two mirror faces or surfaces 54, 54'. Each mirror face 54, 54' defines aspheric shapes. By way of example, the radius at point A is different from the radius at point B while all of the points along the curvature of the mirror faces 54, 54' are progressive and are not constant. For example, the radius at point A may be 105 mm, while a few mm further towards point B it might be 103 mm while at point B the radius might be 101 mm. These examples of radii differences are only examples and are not intended as being limiting. By this design configuration a distortion is introduced which is used to counteract the foreshortening effect due to rear-seat passenger distance variation.

A housing 56 is provided in which a portion of each of the two mirror faces 54, 54' is fitted. A divider 58 is provided as part of the housing 56 to serve as the central attachment area for the two mirror faces 54, 54'.

Figure 6:
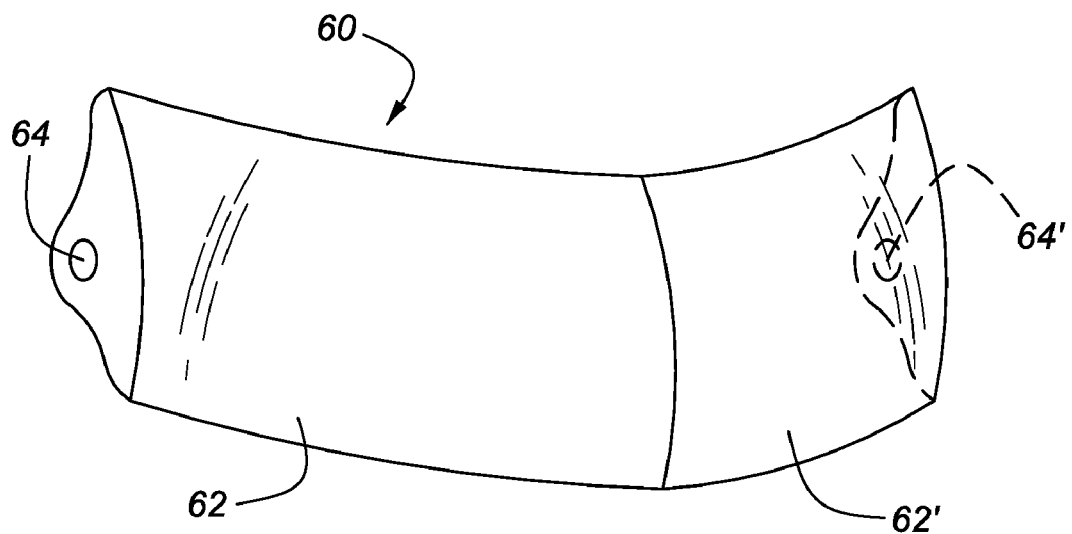
FIG. 6 illustrates a perspective view of a variation of the first preferred embodiment of the conversation mirror of FIG. 3.

An embodiment of the one-piece conversation mirror of FIG. 3 is illustrated in FIG. 6 in which a dual mirror face arrangement, generally illustrated as 60, is shown in perspective view. The dual mirror face arrangement 60 is a one-piece element that is defined by two mirror faces or surfaces 62, 62'. The dual mirror face arrangement 60 is pivotable along the Y-axis (cross-car) for adjustment to accommodate various height viewers or second row occupants. To enable the pivoting a pivoting flange 64 is provided on the end of the mirror face 64 and a pivoting flange 64' is provided on the end of the mirror face 64'. Each flange 64, 64' is pivotably attached to a mirror assembly housing (not shown).

Figure 7:
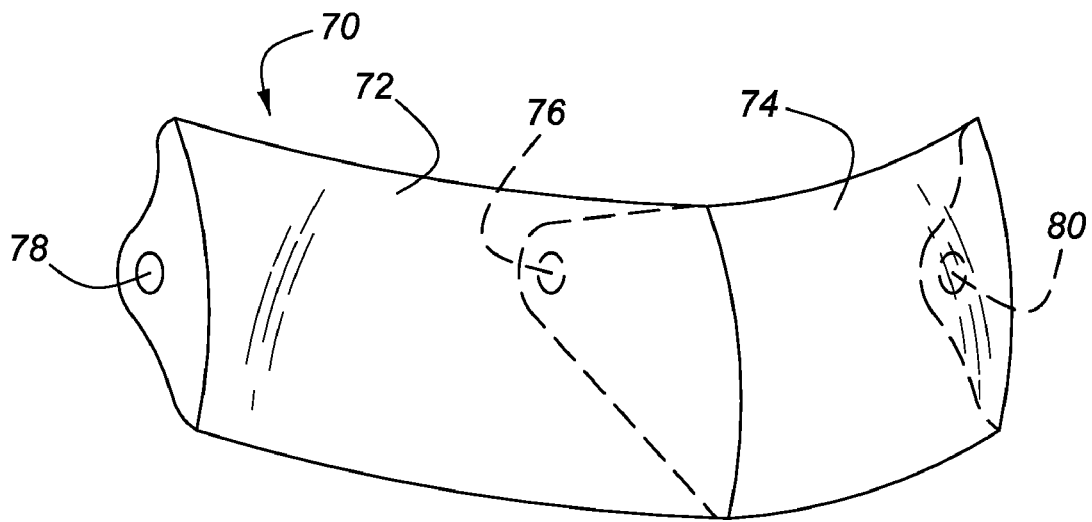
FIG. 7 illustrates a perspective view of a variation of the conversation mirror of FIG. 6 that includes two halves that are pivotably attached.
Figure 8:
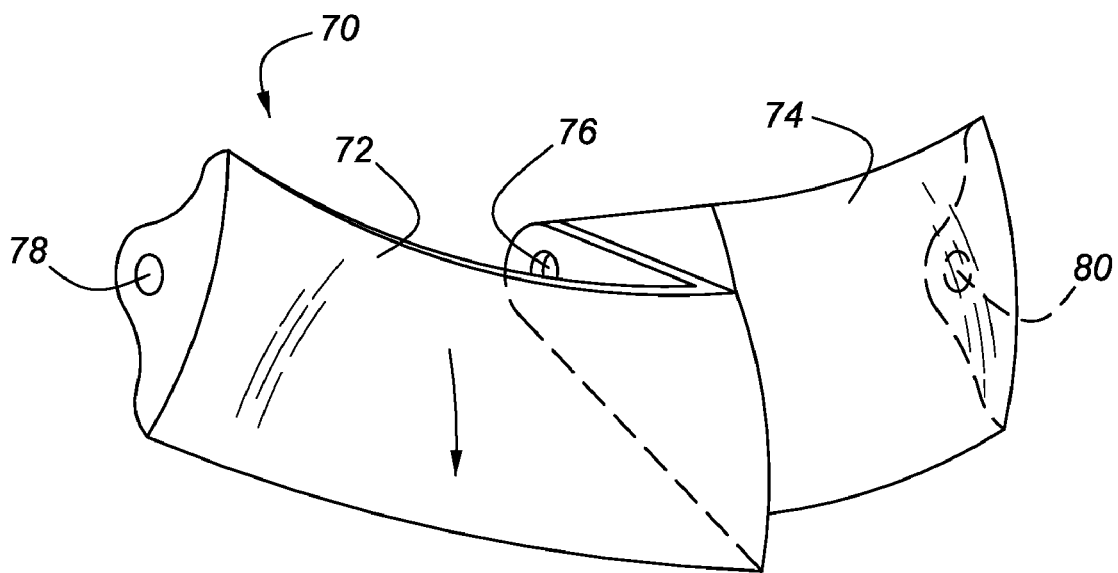
FIG. 8 illustrates a perspective view of the conversation mirror of FIG. 7 but showing one half of the mirror rotated relative to the other half of the mirror.

As a variation of the pivoting mirror arrangement of FIG. 6, a two-piece, dual mirror face arrangement, generally illustrated as 70, is provided in FIGS. 7 and 8. The dual mirror face arrangement 70 is a two-piece assembly that includes a first mirror face 72 and a second mirror face 74. The first mirror face 72 and the second mirror face 74 are pivotably attached at a pivot point 76. In addition, a pivoting flange 78 is provided on the end of the mirror face 72 and a pivoting flange 80 is provided on the end of the mirror face 74. Each flange 78, 80 is pivotably attached to a mirror assembly housing (not shown).

In operation, each of the first mirror face 72 and the second mirror face 74 of the two-piece, dual mirror face arrangement 70 may be pivoted independently to provide an optimum view for the user. In FIG. 7 the first mirror face 72 and the second mirror face 74 are shown in general alignment with each other. In FIG. 8 the first mirror face 72 and the second mirror face 74 are shown out of alignment as may be desired for use by front seat occupants of different heights.

Figure 9:
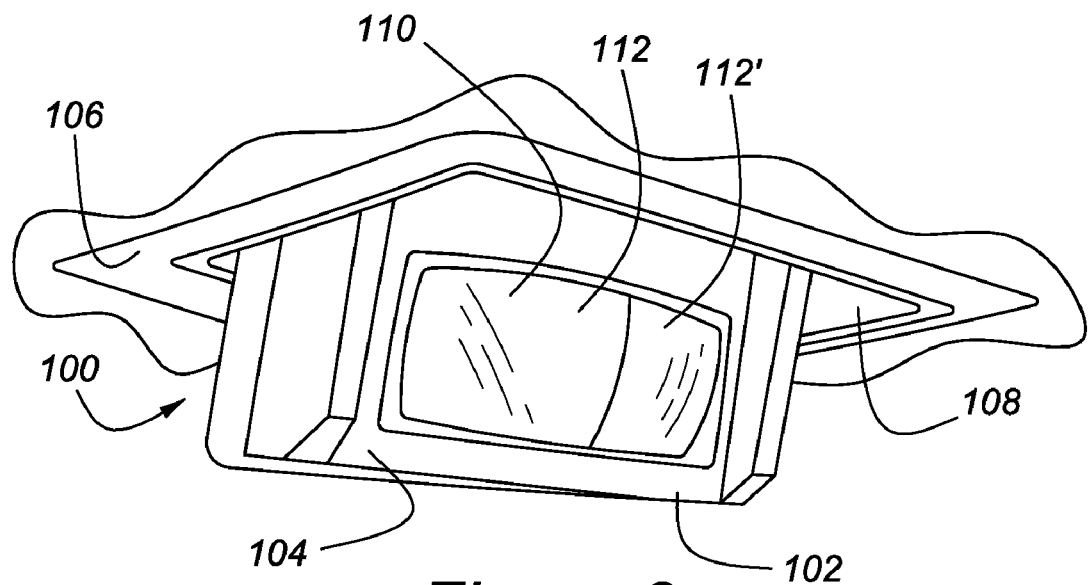
FIG. 9 shows a perspective view of a preferred embodiment of a conversation mirror assembly in an overhead console housing according to the present invention.
Figure 10:
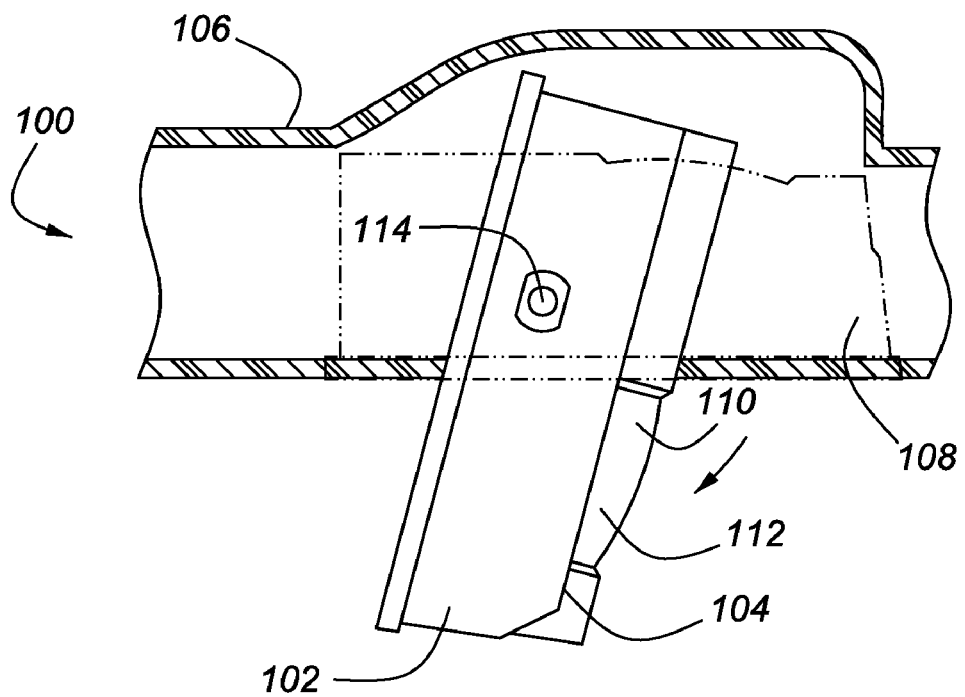
FIG. 10 is a partly sectional elevational view of the conversation mirror assembly and overhead console combination shown in FIG. 9 illustrating the mirror assembly in its operative position as well as showing the stored mirror assembly in phantom.

The conversation mirror arrangement of the present invention is shown in a housing in FIGS. 9 and 10. With reference to FIG. 9, a perspective view of the conversation mirror assembly, generally illustrated as 100, is shown in its deployed position. The mirror assembly 100 includes a body 102 having a mirror side 104. The configuration of the body 102 is shown for illustrative purposes only and is not intended as being limiting. Other design configurations could as well be suited for use with the conversation mirror assembly 100.

The mirror assembly 100 is operatively associated with a vehicle ceiling 106. The mirror assembly 100 may be fixed or may be movable relative to the vehicle ceiling 106. A movable configuration is illustrated such that the mirror assembly 100 assembly is pivotably attached to a mirror-receiving pocket 108 in a known manner. The mirror-receiving pocket 108 is defined in the vehicle ceiling 106.

The mirror assembly 100 includes a mirror 110 which is of the dual mirror face arrangement, one-piece design set forth above in FIG. 3 and discussed in conjunction therewith. However, it is to be understood that the mirror 110 may be of any of the configurations discussed above and illustrated in the accompanying figures.

The dual mirror face arrangement 110 includes a first mirror face 112 and a second mirror face 112'. Each of the mirror faces 112, 112' is biased toward the viewer to provide the front-row occupants with good views of the rear seats of the vehicle.

The mirror assembly 100 is movable between a deployed position illustrated in FIGS. 9 and 10 and its stowed position illustrated in FIG. 10 in phantom lines. The mirror assembly 100 may be pivotably moved between these two positions by a pivot connection 114 which connects the mirror body 102 to the vehicle ceiling 106. A latch of the known type may be used to retain the mirror body 102 in the pocket 108 when not in use.

Figure 11:
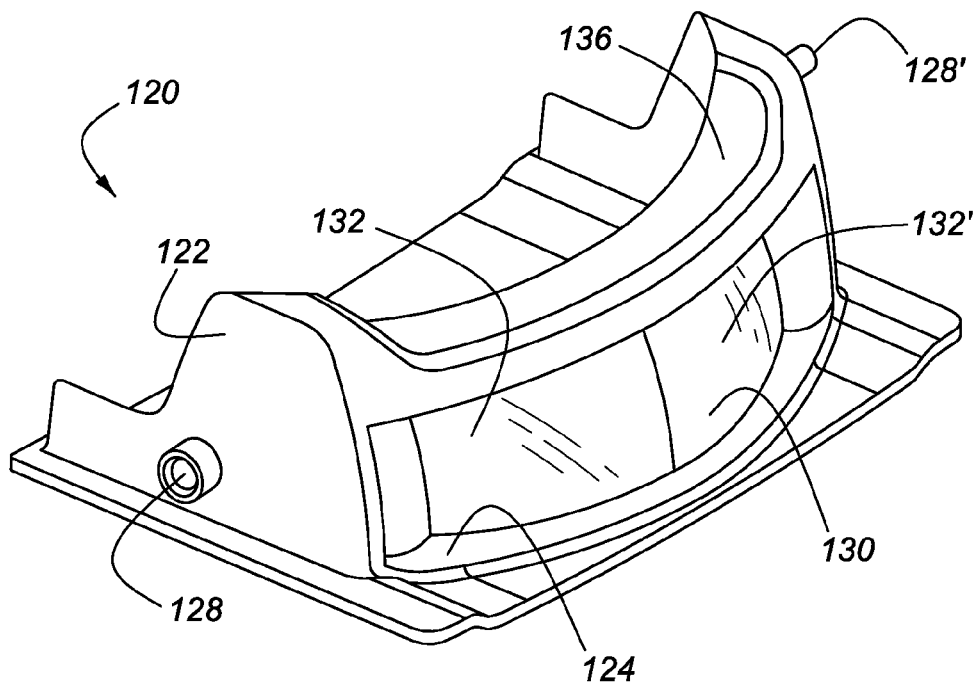
FIG. 11 is a perspective view of an alternate embodiment of a conversation mirror assembly according to the disclosed invention in which the mirrors are illustrated in their stowed and non-functioning positions.
Figure 12:
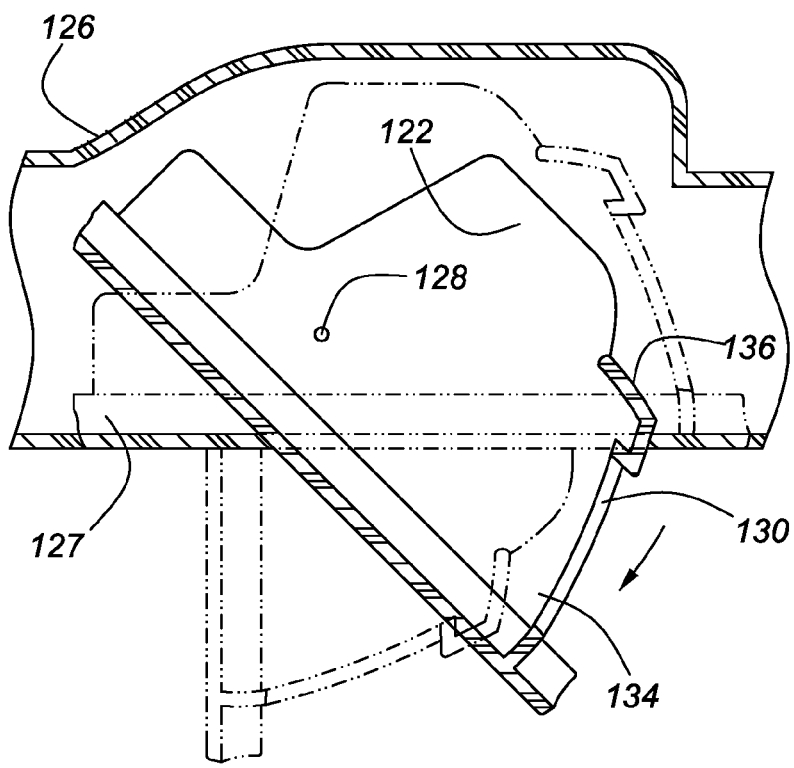
FIG. 12 is a sectional view of the conversation mirror assembly of conversation mirror assembly in place in an overhead console and shown in its closed and open positions.

A variation of the mirror assembly and housing arrangement shown in FIGS. 9 and 10 is illustrated in FIGS. 11 and 12. With reference thereto, a conversation mirror assembly, generally illustrated as 120, is shown in perspective view. The conversation mirror assembly 120 includes a body 122 having a mirror side 124. The configuration of the body 122 is shown for illustrative purposes only and is not intended as being limiting.

The mirror assembly 120 is operatively associated with a vehicle ceiling 126 as shown in FIG. 11. The mirror assembly 120 may be fixed or may be movable relative to the vehicle ceiling 126, however a movable configuration is illustrated in FIG. 11. The mirror assembly 120 is pivotably attached to a mirror-receiving pocket 127 defined in the vehicle ceiling 126. A pair of opposed pivot studs 128, 128' are provided on the mirror body 122.

The mirror assembly 120 includes a mirror 130 which is of the dual mirror face arrangement, one-piece design. The mirror assembly 120 may, however, be of any of the configurations discussed above and illustrated in the accompanying figures.

The mirror assembly 120 includes a first mirror face 132 and a second mirror face 132'. Each of the mirror faces 132, 132' is biased toward the viewer to provide the front-row occupants with good views of the rear seats of the vehicle.

The mirror body 122 includes an article receiving pocket 134 that is defined in part by a lip 136. A variety of items such as sunglasses may be stored in the article receiving pocket 134.

The mirror assembly 120 is movable between three stopped positions as illustrated in FIG. 12. These three stopped positions include a deployed, in-use position illustrated in solid lines, a deployed, article-receiving position illustrated in phantom lines, and a stowed position, also illustrated in phantom lines. A latch of a known type may be used to retain the mirror body 122 in the pocket 127 when not in use.

Figure 13:
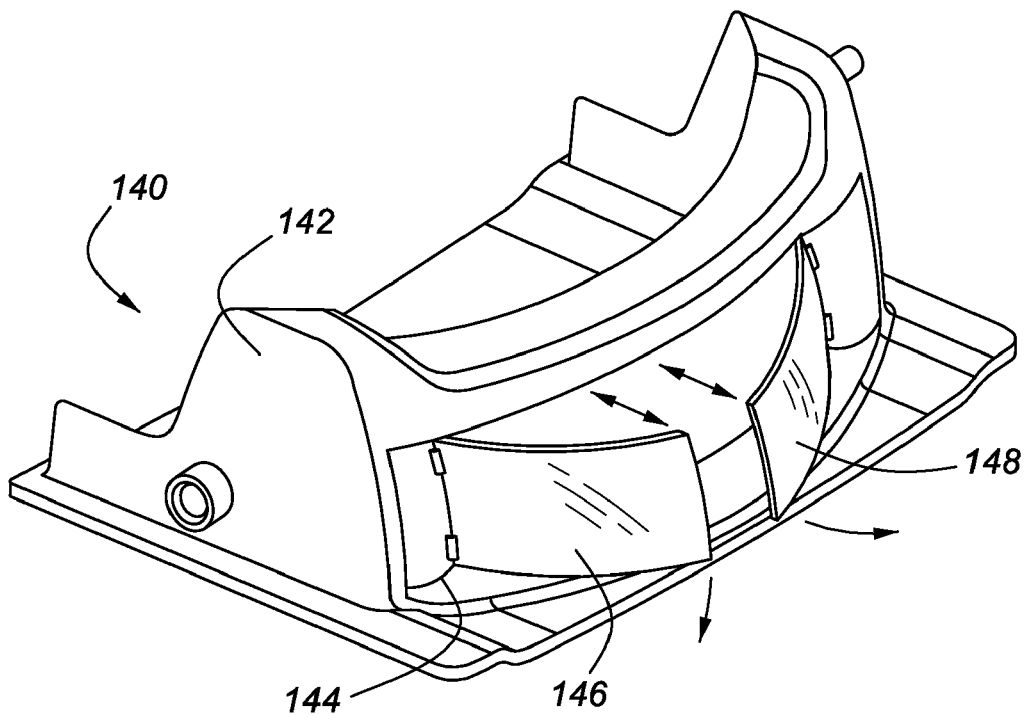
FIG. 13 is the same view of the conversation mirror assembly shown in FIG. 11 but showing the mirror segments in their deployed and functioning positions.
Figure 14:
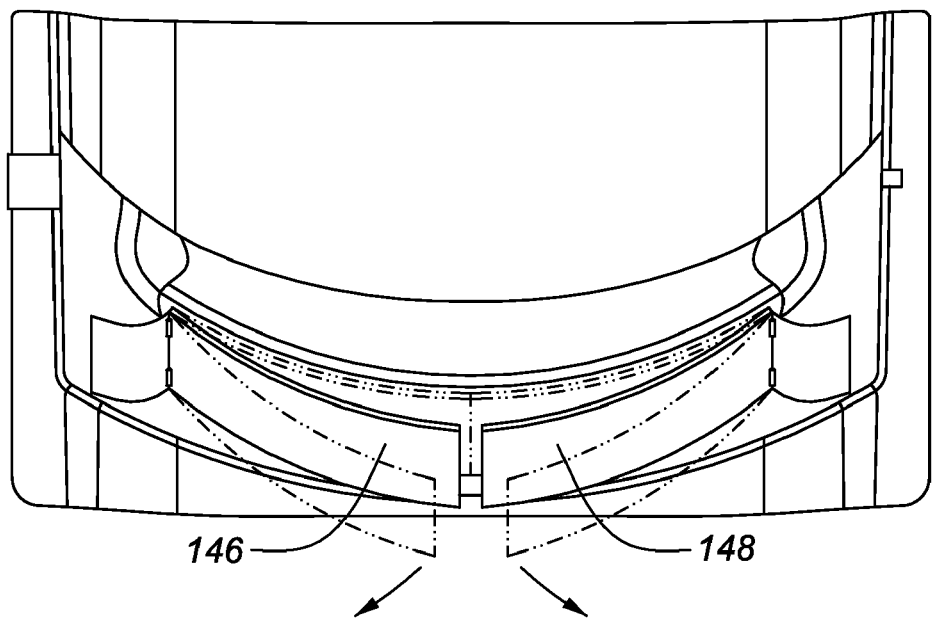
FIG. 14 is a top plan view of the conversation mirror assembly shown in FIG. 13 illustrating the mirror segments in their opened positions.

The mirror assembly illustrated in FIGS. 11 and 12 may be modified as set forth in FIGS. 13 and 14 to provide an optimum view for both the driver and the passenger by allowing for mirror faces that are individually movable. Specifically, a conversation mirror assembly, generally illustrated as 140, is shown. The mirror assembly 140 is generally of the same function and design as the mirror assembly 120 discussed above and shown in FIGS. 11 and 12. However, according to the embodiment of FIGS. 13 and 14, the mirror assembly 140 includes a body 142 having a mirror side 144. The mirror assembly 140 includes a first mirror face 146 that is hingedly attached to the mirror side 144 and a second mirror face 148 that is hingedly attached to the mirror side 144. Each of the first and second mirror faces 146, 148 may be deployed as illustrated in phantom lines in FIG. 14 or may be stowed as illustrated in solid lines in FIGS. 13 and 14. This arrangement provides both the driver and the passenger with extra flexibility in achieving the optimum view possible.

Figure 15:
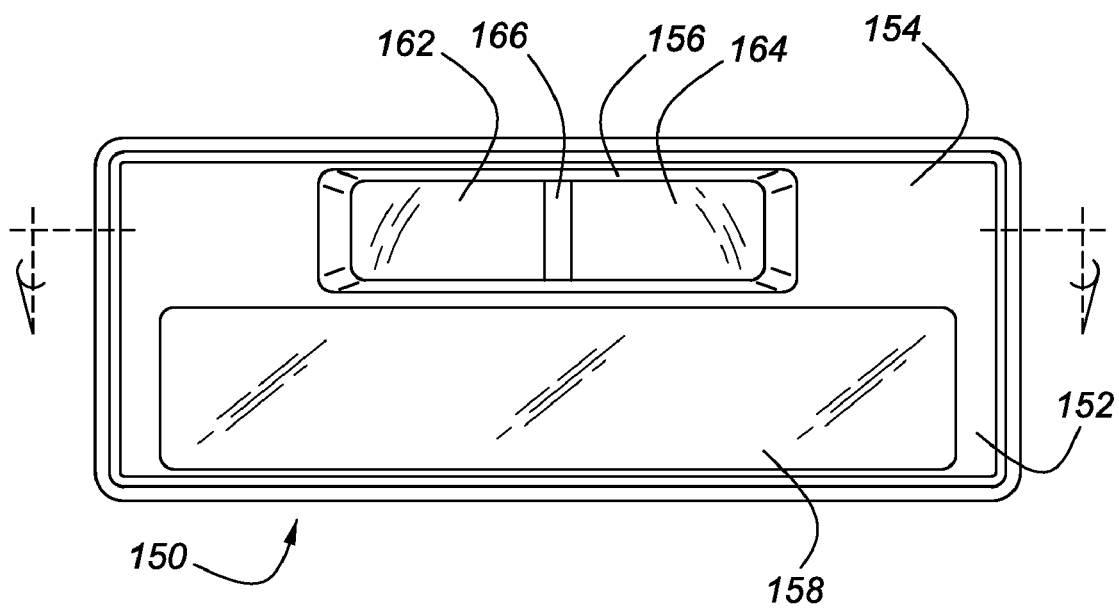
FIG. 15 is a front view of an additional alternate embodiment of the conversation mirror as set forth herein.
Figure 16:
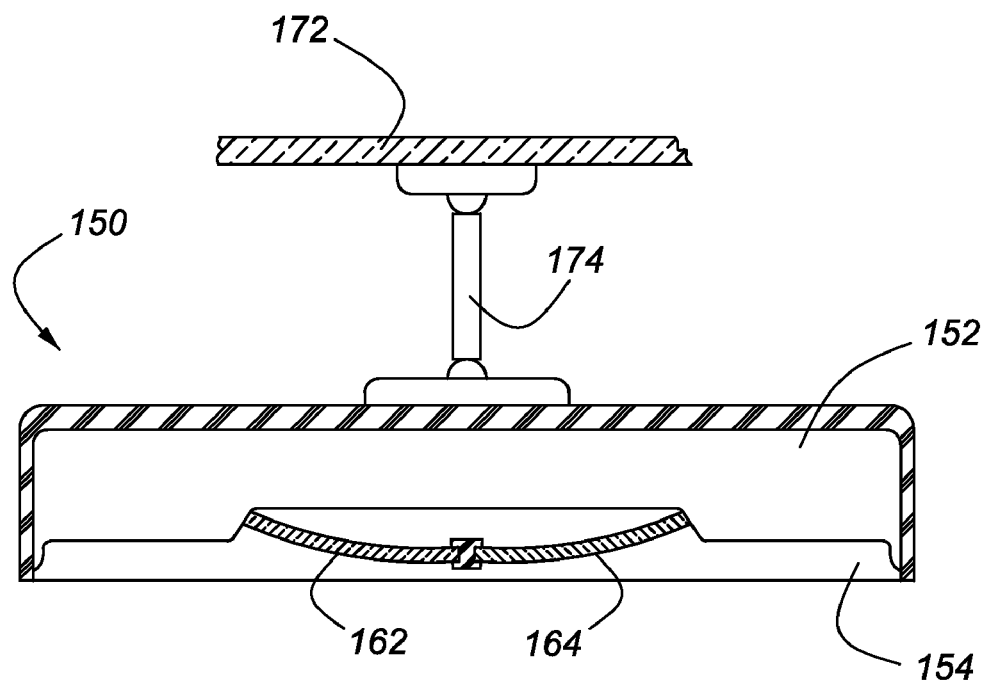
FIG. 16 is a sectional view of the conversation mirror of FIG. 15 taken along lines 16-16 of FIG. 15.
Figure 17:
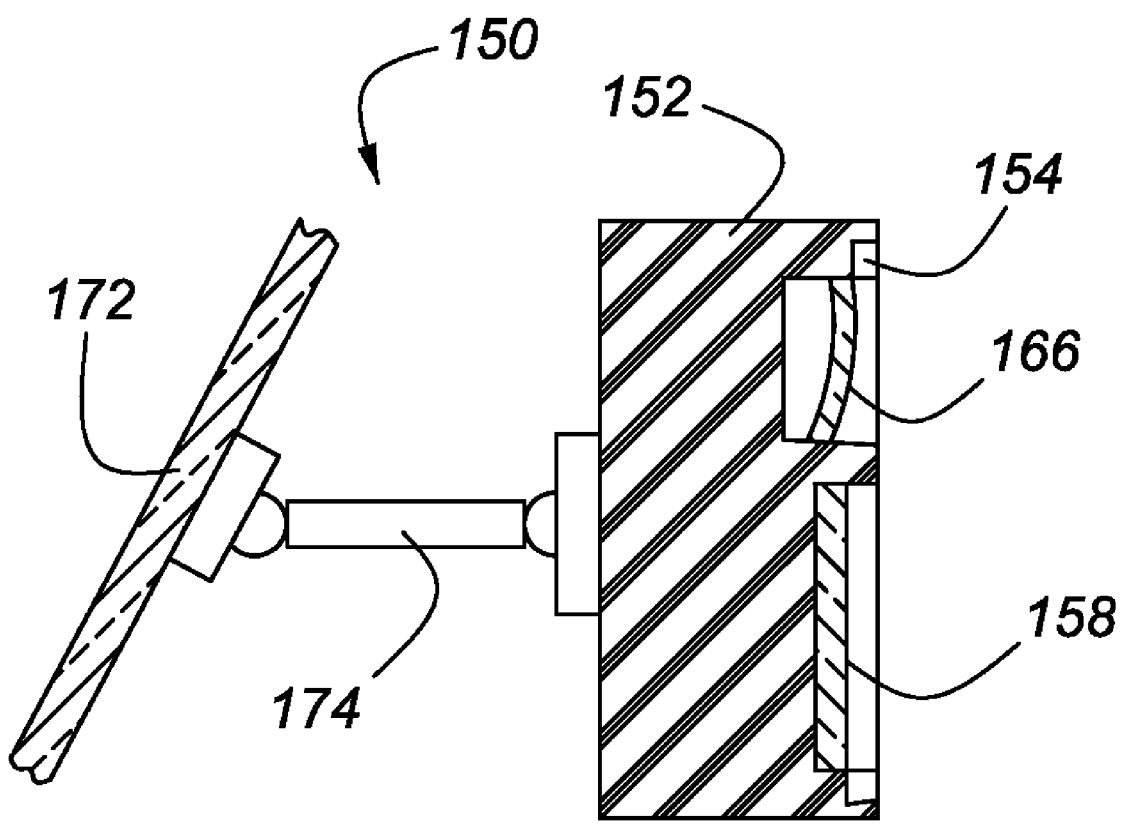
FIG. 17 is a sectional view of the conversation mirror of FIG. 5 taken along lines 17-17 of FIG. 15.

An alternate embodiment of the mirror disclosed herein is shown in FIGS. 15 through 17. The embodiment shown in these figures differs from that shown and discussed above in at least two ways. First, FIGS. 15 through 17 show a mirror assembly that is attached to a windshield instead of to a vehicle ceiling, although it is to be understood that the embodiment of FIGS. 15 through 17 could be attached to the vehicle's ceiling as well. Second, FIGS. 15 through 17 show a mirror assembly in which the dual-radius conversation mirror of the present invention is combined with a conventional rear-view mirror. In these views FIG. 16 is a sectional view of the mirror assembly 150 taken along lines 16-16 of FIG. 15 while FIG. 17 is a sectional view of the mirror assembly 150 taken along lines 17-17 of FIG. 15.

With reference to FIGS. 15 through 17, a mirror assembly, generally illustrated as 150, is shown. The mirror assembly 150 includes a mirror body 152 having a mirror side 154. A conversation mirror portion 156 is provided on the mirror side 154 of the mirror body 152 as is a rear view mirror portion 158. The rear view mirror portion 158 includes a flat mirror 160 of the type known in the art for use by the driver in observing traffic and pedestrians behind the vehicle. The flat mirror 160 may be of the day-night variety.

The conversation mirror portion 156 includes a first mirror surface 162 and a second mirror surface 164. A divider 166 may be provided as part of the conversation mirror portion 156 between the first mirror surface 162 and the second mirror surface 164 as illustrated or the first and second mirror surfaces 162, 164 may be integral.

As noted above, the mirror assembly 150 may be attached to either a vehicle front windshield or to the vehicle ceiling. As illustrated in FIGS. 16 and 17, the mirror assembly 150 is attached to a vehicle windshield 172 by an attachment assembly 174 of the known variety. The attachment assembly 174 is provided for illustrative purposes only, as other attachment assemblies could readily be substituted for that shown.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A conversation mirror assembly for a vehicle having a passenger compartment, the passenger compartment having a rear space, a first front seat for a first occupant and a second front seat for a second occupant, the conversation mirror assembly comprising:
    a mirror housing having a mirror support surface;
    a first conversation mirror attached to said mirror support surface of said mirror housing, said first conversation mirror being biased toward the first occupant to provide visual contact between the first occupant of the first front seat and the rear space of the vehicle, said first conversation mirror having a surface, said first conversation mirror surface having a curved shape;
    a second conversation mirror attached to said mirror support surface of said mirror housing, said second conversation mirror being biased toward the second occupant to provide visual contact between the second occupant of the second front seat and the rear space of the vehicle, said second conversation mirror having a surface, said second conversation mirror surface having a curved shape; and
    at least one of said first conversation mirror surface curved shape and said second conversation mirror surface curved shape being aspheric.

2. The conversation mirror assembly of claim 1 wherein said first conversation mirror and said second conversation mirror define separate mirror segments.

3. The conversation mirror assembly of claim 1 wherein said first conversation mirror and said second conversation mirror define separate facets of a single mirror.

4. The conversation mirror assembly of claim 1 wherein said shapes both of said first conversation mirror surface and said second conversation mirror surface define an aspheric surface.

5. The conversation mirror assembly of claim 1 further including a flat rearview mirror attached to said mirror support surface of said mirror housing.

6. The conversation mirror assembly of claim 1 wherein the passenger compartment has a forward roof area and said mirror housing is attached to the forward roof area.

7. The conversation mirror assembly of claim 1 wherein the vehicle has a windshield and said mirror housing is attached to the windshield.

8. A conversation mirror assembly for a vehicle having a passenger compartment, the passenger compartment having a forward space, a rearward space, a first front seating area for a first occupant, a second front seating area for a second occupant, the conversation mirror assembly comprising:
    a first mirror face having a convex surface and a second mirror face having a convex surface, said first mirror face being usable by the first occupant to view at least a portion of the rear space of the passenger compartment, said first mirror face being provided in the forward space of the passenger compartment, said second mirror face being usable by the second occupant to view at least a portion of the rear space of the passenger compartment, said second mirror face being provided in the forward space of the passenger compartment; said convex surface of said first mirror face defining a shape and said convex surface of said second mirror face defining a shape, at least one of said shapes being aspheric.

9. The conversation mirror assembly of claim 8 further including a mirror housing having a mirror support surface, said first mirror face and said second mirror face being mounted on said mirror support surface of said mirror housing.

10. The conversation mirror assembly of claim 8 wherein said curved surface of said first mirror face and said curved surface of said second mirror face define separate mirror segments.

11. The conversation mirror assembly of claim 8 wherein said curved surface of said first mirror face and said curved surface of said second mirror face define separate facets of a single mirror.

12. The conversation mirror assembly of claim 11 wherein both of said shapes define an aspheric surface.

13. The conversation mirror assembly of claim 11 further including a flat rearview mirror attached to said mirror support surface of said mirror housing.

14. A conversation mirror assembly a vehicle having a passenger compartment, the conversation mirror assembly comprising:
    a mirror housing, said mirror housing being adapted for attachment to the forward area of the passenger compartment of the vehicle for use by a forward vehicle occupant;
    a left-side convex mirror portion having a first mirrored surface, said left-side convex mirror portion being fitted to said mirror support surface of said mirror housing, said first mirrored surface having a shape;
    a right-side convex mirror portion having a second mirrored surface, said right-side convex mirror portion being fitted to said mirror support surface of said mirror housing, said second mirrored surface having a shape, said mirrored surface of said left-side convex mirror and said mirrored surface of said right-hand convex mirror being symmetrically opposite, and at least one of said shape of said first mirrored surface and said shape of said second mirrored surface being aspheric.

15. The conversation mirror assembly of claim 14 wherein said left-side convex mirror portion and said right-side convex mirror portion define separate mirror segments.

16. The conversation mirror assembly of claim 14 wherein said left-side convex mirror portion and said right-side convex mirror portion define separate facets of a single mirror.

17. The conversation mirror assembly of claim 14 wherein both said shape of said first mirrored surface and said shape of said second mirrored surface define an aspheric surface.

18. The conversation mirror assembly of claim 14 further including a flat rearview mirror attached to said mirror support surface of said mirror housing.

19. The conversation mirror assembly of claim 14 wherein the passenger compartment has a forward roof area and said mirror housing is attached to the forward roof area.

20. The conversation mirror assembly of claim 14 wherein the vehicle has a windshield and said mirror housing is attached to the windshield.

* * * * *